J. W. EBERHART.
Sulky-Plow.
No. 203,432. Patented May 7, 1878.
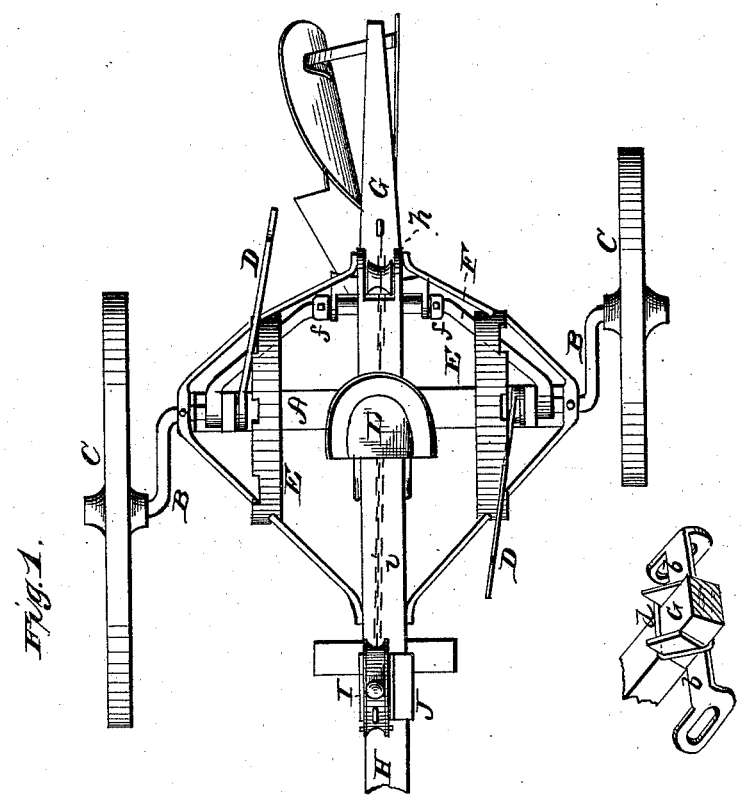
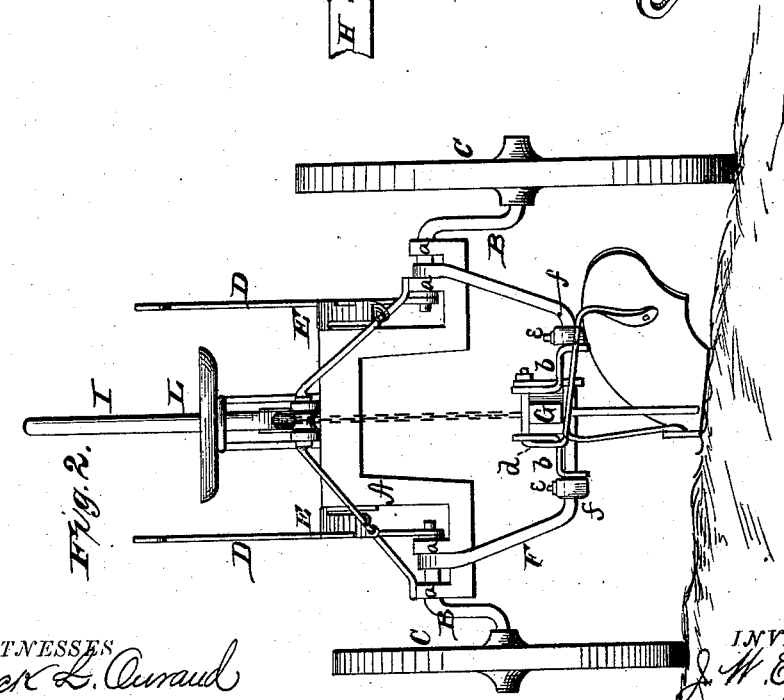

UNITED STATES PATENT OFFICE.

JACOB W. EBERHART, OF MISHAWAKA, INDIANA.

IMPROVEMENT IN SULKY-PLOWS.

Specification forming part of Letters Patent No. 203,432, dated May 7, 1878; application filed March 27, 1878.

*To all whom it may concern:*

Be it known that I, JACOB W. EBERHART, of Mishawaka, in the county of St. Joseph and in the State of Indiana, have invented certain new and useful Improvements in Sulky-Plows; and do hereby declare that the following is a full, clear, and exact description thereof, reference being had to the accompanying drawings, and to the letters of reference marked thereon, making a part of this specification.

The nature of my invention consists in the construction and arrangement of a sulky attachment for plows, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a rear elevation of my invention.

A represents an arched axle of the angular form shown in Fig. 2. On each arm of this axle are formed suitable bearings $a\ a$ for a crank, B, carrying upon its outer end a wheel, C. This crank is on its inner end provided with a lever, D, which is held in a rack, E.

Upon the inner ends of each of the two cranks B B is hung a stirrup, F, extending in rear of the axle, and on this stirrup are placed two slotted angular plates, $b\ b$, fastened on opposite sides of the plow-beam G by a clip, $d$, thus connecting the plow to the stirrup in such a manner that it can not only turn thereon, but that it will also have a limited backward and forward movement. The plow is also adjustable laterally on the stirrup by means of collars $f\ f$, fastened by set-screws $e\ e$, which may be moved to either side, and are intended to hold the plow in its proper position, or in any desired position, on the stirrup, as far as lateral movement is concerned.

On top of the axle A, in the center, is secured the tongue H, and above the same, between plates J J, is pivoted a lever, I, the lower end of which forms a segment of a circle. To the front portion of this segment is hooked a chain, $i$, which passes under the segment rearward and around a pulley, $h$, in the rear end of the tongue, down to and connecting with the plow-beam G. L is the driver's seat.

With this machine the operator has complete control of the plow, as though he had hold of the handles. By the levers D D he can raise or lower either side at will. Both wheels being on cranks, the furrow-wheel in front and the land-wheel in rear of the axle equal distances, allows the plow to cut out when throwing the furrow-slice outward without having the land-wheel drop into the furrow.

It is adapted to any kind of plow, and can be used on stony ground. The plow can rise and slide over a rock without interfering with the sulky. It is suited to either right or left hand plows, by simply changing the wheels and the levers on the cranks.

By the front lever I the plow can easily be raised to avoid obstructions.

By letting out or taking up the lifting-chain $i$, the plow can be adjusted to any depth required.

Having thus fully described my invention, what I claim as new, and desire to secure by Letters Patent, is—

1. The arched axle A, provided with the bearings $a\ a$ at each end, through which the cranks B B pass, the levers D D, connected to the inner ends of said cranks, and the stirrup F, all constructed substantially as and for the purposes herein set forth.

2. The combination of the swinging stirrup F, plow-beam G, slotted angular plates $b\ b$, clip $d$, and adjustable collars $f\ f$, substantially as and for the purposes herein set forth.

In testimony that I claim the foregoing I have hereunto set my hand this 9th day of March, 1878.

JACOB W. EBERHART.

Witnesses:
 MAJOR A. CURTIS,
 JAS. H. MOSHER.